US012637153B1

(12) United States Patent
Ver Woert

(10) Patent No.: US 12,637,153 B1
(45) Date of Patent: May 26, 2026

(54) AUTOMATIC LEVELING AND PREDICTIVE BALANCING SYSTEM FOR TRACTORS

(71) Applicant: Daniel R. Ver Woert, Butler, MO (US)

(72) Inventor: Daniel R. Ver Woert, Butler, MO (US)

( * ) Notice: Subject to any disclaimer, the term of this patent is extended or adjusted under 35 U.S.C. 154(b) by 0 days.

(21) Appl. No.: 19/333,551

(22) Filed: Sep. 19, 2025

(51) Int. Cl.
*B62D 49/08* (2006.01)
*B62D 37/06* (2006.01)
*G01C 9/06* (2006.01)

(52) U.S. Cl.
CPC ........... *B62D 49/085* (2013.01); *B62D 37/06* (2013.01); *G01C 9/06* (2013.01)

(58) Field of Classification Search
None
See application file for complete search history.

(56) References Cited

U.S. PATENT DOCUMENTS

| | | |
|---|---|---|
| 2,703,718 A | 3/1955 | Hutchinson |
| 4,588,206 A | 5/1986 | Powers |

| | | | |
|---|---|---|---|
| 5,131,802 A | 7/1992 | Sunami et al. | |
| 9,702,114 B2 * | 7/2017 | Larson ...................... | E02F 9/18 |
| 11,433,956 B2 * | 9/2022 | Calcagnotto Da Silva .................. B62D 49/085 | |
| 2010/0327569 A1 * | 12/2010 | Bourn .................. B62D 49/085 280/755 | |
| 2021/0403103 A1 * | 12/2021 | Alshaalan ........... | B66F 9/07554 |

FOREIGN PATENT DOCUMENTS

| | | | | |
|---|---|---|---|---|
| DE | 3904227 A1 * | 8/1990 | ........... | B62D 49/085 |

* cited by examiner

*Primary Examiner* — Abdhesh K Jha
(74) *Attorney, Agent, or Firm* — Dale J. Ream

(57) ABSTRACT

An automatic leveling and predictive balancing system for a tractor includes a laterally translatable counterweight assembly mounted to a standard hitch. The system dynamically repositions the counterweight in response to tilt sensor data or, in advanced embodiments, in anticipation of unlevel terrain based on speed, heading, and stored terrain data. The system comprises a weight compartment, a drive mechanism, and a controller operably coupled to a sensor array. The controller actuates the counterweight automatically to improve stability and traction. A predictive mode evaluates operational parameters to initiate weight shifting prior to encountering terrain changes. Manual override controls May also be included.

24 Claims, 11 Drawing Sheets

AUTOMATIC LEVELING AND PREDICTIVE BALANCING SYSTEM FOR TRACTORS

BACKGROUND OF THE INVENTION

The present invention relates to vehicle stability systems and, more particularly, to an automatic lateral counterweight system for tractors and off-road vehicles that enhances safety and performance when operating on uneven or sloped terrain.

Tractors and similar work vehicles frequently operate on rough, sloped, or uneven terrain. Many tractors used for mowing, such as those used by municipalities or counties, have a relatively narrow wheelbase and may be quite tall or even include a cab. Under such conditions, there is a substantial risk of the tractor tipping or rolling over-a hazard that continues to be a leading cause of injury and fatality among farm and construction equipment operators. A rollover event can result in catastrophic injury or death, particularly if the operator is not secured with a rollover protection system (ROPS) or if the tipping occurs too quickly for evasive action. Moreover, even in non-fatal events, tipping may damage expensive equipment or render a vehicle inoperable in remote locations. Fixed ballast systems are commonly used to improve traction and prevent lifting or swaying of the tractor, but these systems offer only a static center of mass and do not adjust for real-time changes in terrain or load dynamics.

Beyond the safety risks, the inability to dynamically stabilize the vehicle poses operational disadvantages. Operators often face challenges in completing a task due to excessive lateral tilt, which limits mobility and effectiveness in traversing hillsides, embankments, or ditches. In some cases, workers have resorted to standing or sitting on one side of a vehicle to act as human counterweights-introducing serious risk of injury and violating basic safety protocols. This ad hoc method of compensating for lateral instability not only endangers personnel but reflects the inadequacy of current solutions. A need exists for a smarter, automatic counterbalance system that not only responds in real time to vehicle tilt but can also anticipate and prepare for changes in terrain before instability occurs.

SUMMARY OF THE INVENTION

The invention provides an automatic leveling and balancing system for tractors and similar vehicles that improves lateral stability and operational traction. The system includes a counterweight assembly that is mounted to a standard three-point hitch or similar coupling point on the vehicle. Unlike static ballast boxes, the counterweight assembly of the present invention is capable of lateral translation—side-to-side movement relative to the tractor's longitudinal axis—to respond dynamically to changing operating conditions.

The system includes a weight compartment contained within the counterweight assembly, which can be loaded with adjustable ballast depending on the vehicle size, operator weight, and typical operating grade. A sensor array detects the tilt angle or grade of the vehicle in real time and communicates with a controller, which is operably connected to a drive mechanism. The controller automatically commands the drive mechanism to laterally shift the counterweight to the uphill side of the vehicle, thereby reducing the risk of rollover and increasing stability and traction.

In one embodiment, the drive mechanism may include hydraulic actuators, a winch and pulley system, or geardriven mechanisms capable of translating the counterweight assembly under load. A manual override control may be provided to give the operator the ability to adjust the system manually when desired.

A further embodiment includes predictive control, wherein the system initiates lateral movement of the counterweight in advance of encountering a tilt condition. This predictive logic leverages data such as vehicle speed, directional heading, and stored terrain profiles. A sensor system incorporating a GPS receiver and inertial measurement unit (IMU) may be used in conjunction with a memory module storing terrain-response data. The controller, in data communication with the memory and operably coupled to the sensor system and drive mechanism, anticipates terrain conditions and proactively actuates the counterweight to enhance stability.

This invention is adaptable for use not only on tractors, but also on a wide range of other vehicles including riding mowers, ATVs, UTVs, heavy machinery, and utility vehicles such as the Kawasaki Mule, Bobcat Toolcat, and Polaris Ranger.

Therefore, an object of the present invention is to provide an automatic leveling system for tractors that improves vehicle stability and reduces rollover risk.

Another object of the invention is to provide a counterweight system that adjusts automatically in response to tilt or grade conditions without requiring operator input.

Still another object of the invention is to provide a system that enhances traction, particularly during operation in four-wheel drive mode.

Yet another object of the invention is to provide a predictive balancing feature that anticipates terrain changes based on speed and heading and adjusts the counterweight position preemptively.

A particular object of the invention is to provide a modular, hitch-mounted system that can be retrofitted to existing tractors and other off-road vehicles.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIG. 6b is an isolated view on an enlarged scale taken from FIG. 6a;

FIG. 7a is an isolated side view of the automatic balancing system illustrated in FIG. 6a;

FIG. 7b is an isolated view on an enlarged scale taken from FIG. 7a;

DESCRIPTION OF THE PREFERRED EMBODIMENT

Figure 10A:
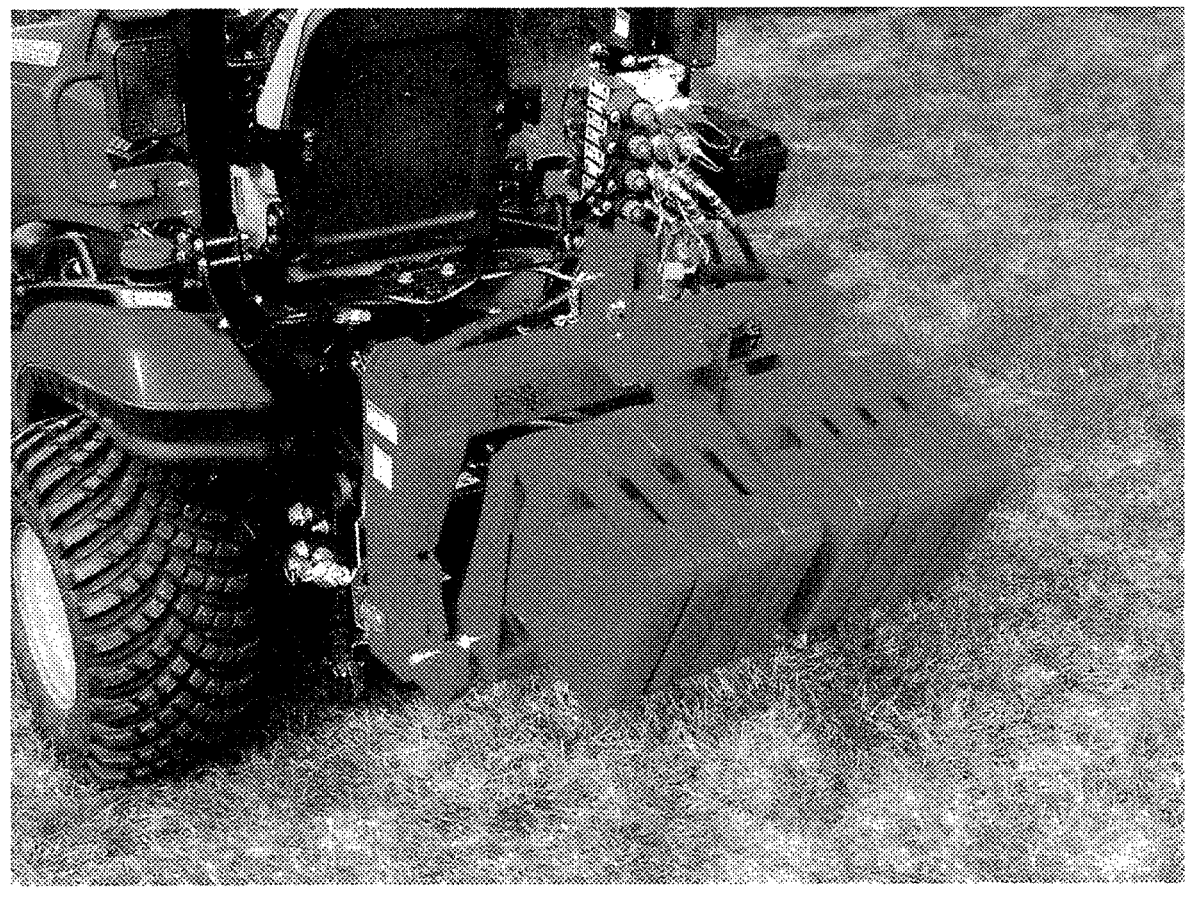
FIGS. 10a to 10c are photographs illustrating a prototype of the present invention operatively connected to more streamlined lawn tractors of a type intended for use with the present invention.
Figure 10B:
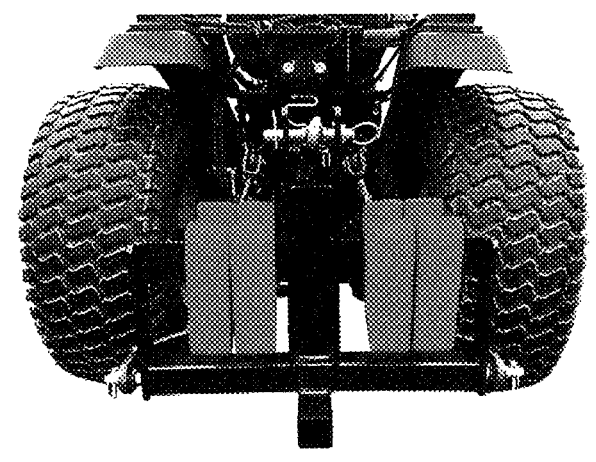
Figure 10C:
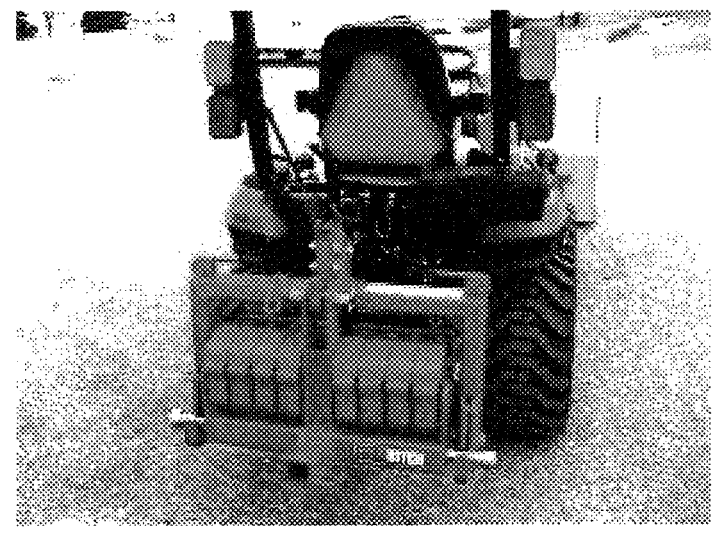

An automatic leveling system, generally designated as 100, is configured for mounting on a tractor 10. The system is mounted via a mounting structure 110 (also referred to as a support frame), which is compatible with a standard three-point hitch 11 or equivalent connection. As an initial matter, the limitations of single-line CAD drawings are acknowledged as illustrations of the tractor 10 may reflect or imply a wider and more stable wheelbase than the taller and more narrow trackers that might benefit the most by the present invention. In other words, the photographs of FIGS. 10a to 10c of more streamlined tractors having a more pronounced longitudinal configuration and less of a wide and stable wheelbase are more illustrative of the preferred embodiment of the present invention.

The core component of the system is a counterweight assembly 120, which is movably mounted to allow lateral translation—that is, side-to-side movement relative to the lengthwise (longitudinal) axis of the tractor. This counterweight assembly 120 houses a weight compartment 122, which may be filled with steel plates 122a, liquids, granular ballast, or other mass as appropriate for the specific application. The amount and type of ballast may vary depending on the tractor size, operator weight, and terrain. The counterweight compartment 122 may also be referred to as a carriage 122.

A sensor array 130 is affixed to the system or to the vehicle chassis and is configured to measure the tilt angle or grade. Preferably, the sensor array 130 includes a pair of cameras 131 mounted to the tractor frame and situated laterally displaced from one another along a common horizontal axis. It is understood that in operation, the camera data generated by each camera 131 will begin to detect a slope ahead of the pathway of the tractor 10 (for instance, one camera will detect a level elevation whereas the other camera will detect a sloped elevation) and, in combination with a controller 150 (or CPU), the sensor array 130 is configured to communicate electronically with the drive mechanism 142 laterally shift the counterweight assembly 120. In an embodiment, the sensor array 130 may include an accelerometer, gyroscope, or a full inertial measurement unit (IMU) to provide multi-axis tilt and orientation data. In yet another embodiment, the sensor array 130 may include a GPS receiver 132, a speed sensor 134, and a heading detector 136—the operation of which will be described later.

The system 100 further includes a drive mechanism 140 mechanically coupled to the counterweight assembly 120. The drive mechanism 140 is capable of actuating the lateral movement of the counterweight, and may take the form of a hydraulic cylinder, winch and pulley system, or cog-to-cog gear drive. The drive mechanism is controlled by a controller 150, which receives data from the sensor array 130 and calculates whether, and how far, the counterweight must shift to counteract a detected tilt condition.

Figure 3A:
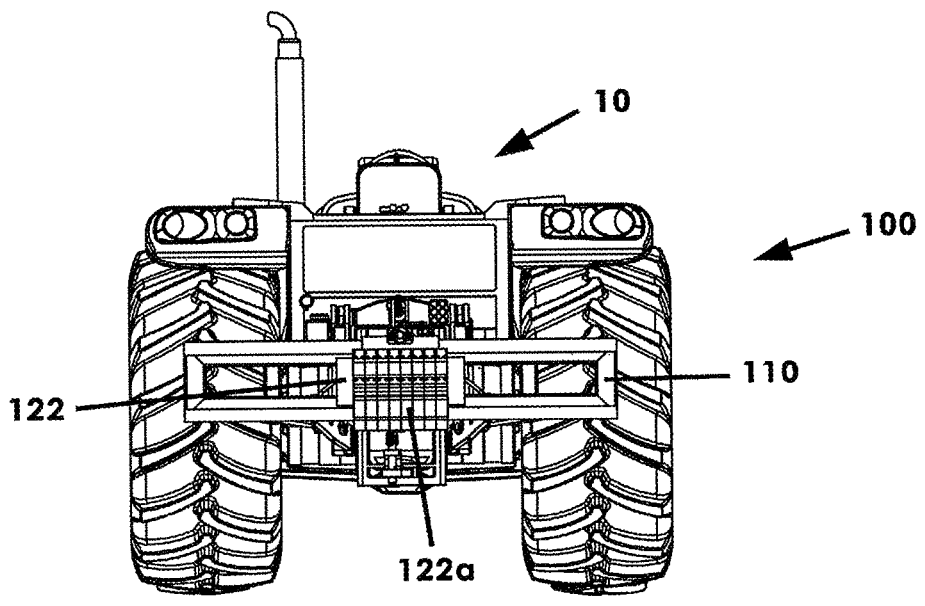
FIG. 3a is a rear view of the automatic balancing system as in FIG. 1, illustrated with the tractor situated on level terrain.
Figure 3B:
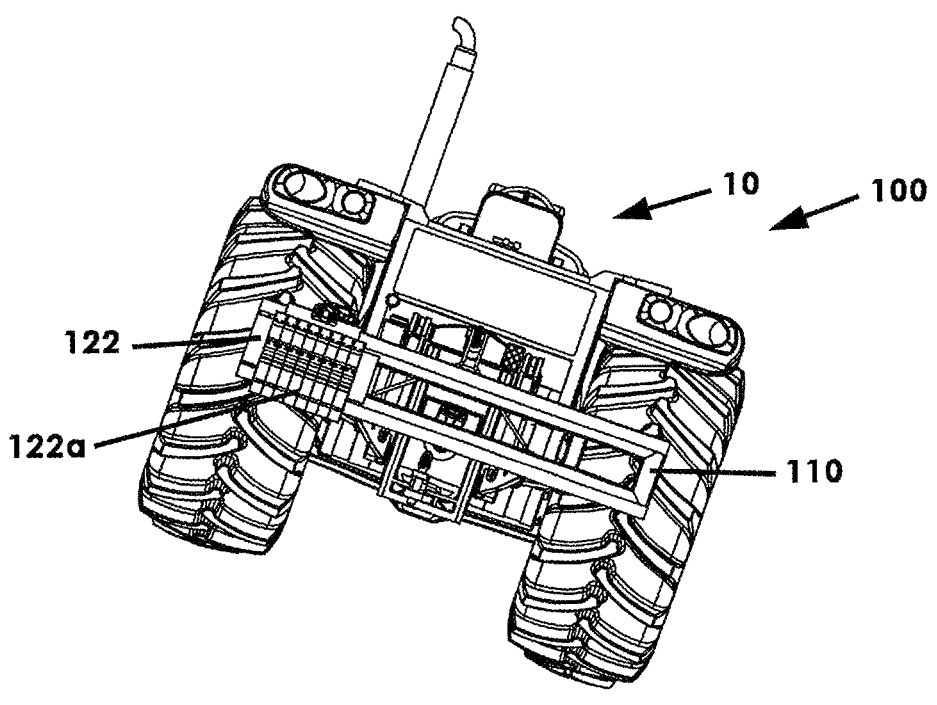
FIG. 3b is another view of the automatic balancing system as in FIG. 3a, illustrated with the tractor situated on a left-side sloped terrain.
Figure 4A:
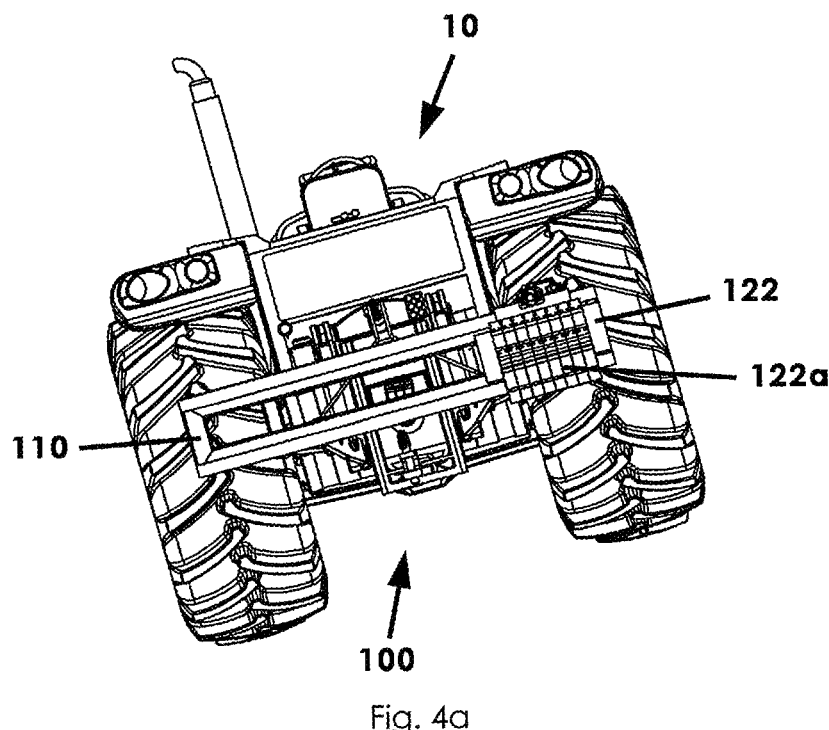
FIG. 4a is another view of the automatic balancing system as in FIG. 3a, illustrated with the tractor situated on a right-side sloped terrain.
Figure 4B:
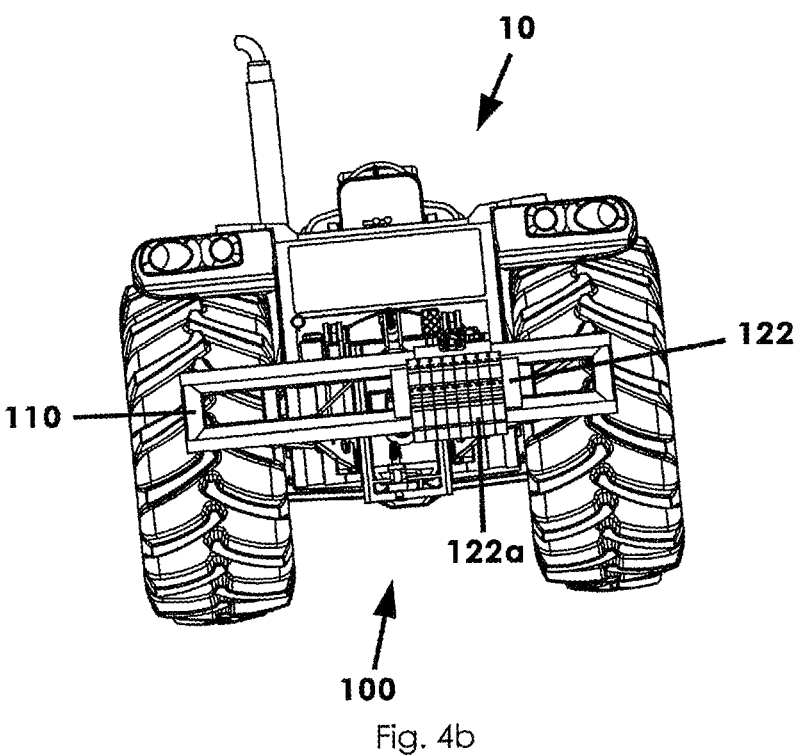
FIG. 4b is another view of the automatic balancing system as in FIG. 3a, illustrated with the tractor situated on a moderately right-side sloped terrain.

In operation, when the tractor tilts to the left or right on uneven terrain, the sensor array 130 detects this deviation from level. The controller 150 interprets this data and directs a signal to the drive mechanism 140 to shift the counterweight assembly 120 to the uphill side, thereby offsetting the tilt. Complete slidable translation to the left (when a severe slope to the left side of the tractor 10 is experienced) and complete lateral translation to the right (when a severe slope to the right side of the tractor 10 is experienced) are shown in FIGS. 3b and 4a. In addition, a partial slidable movement of the counterweight assembly 120 as a result of a minor slope is illustrated in FIG. 4b. Once the tractor returns to level ground, the counterweight assembly 120 may return automatically to center. Structurally, the sensor array 130 may be electrically connected to a processor that is configured or programmed to actuate the drive mechanism 140 as described above or the sensor array 130 may be directly connected via electronics or wiring to the counterweight assembly 120 and configured to operate with maximum efficiency and speed.

Figure 5:
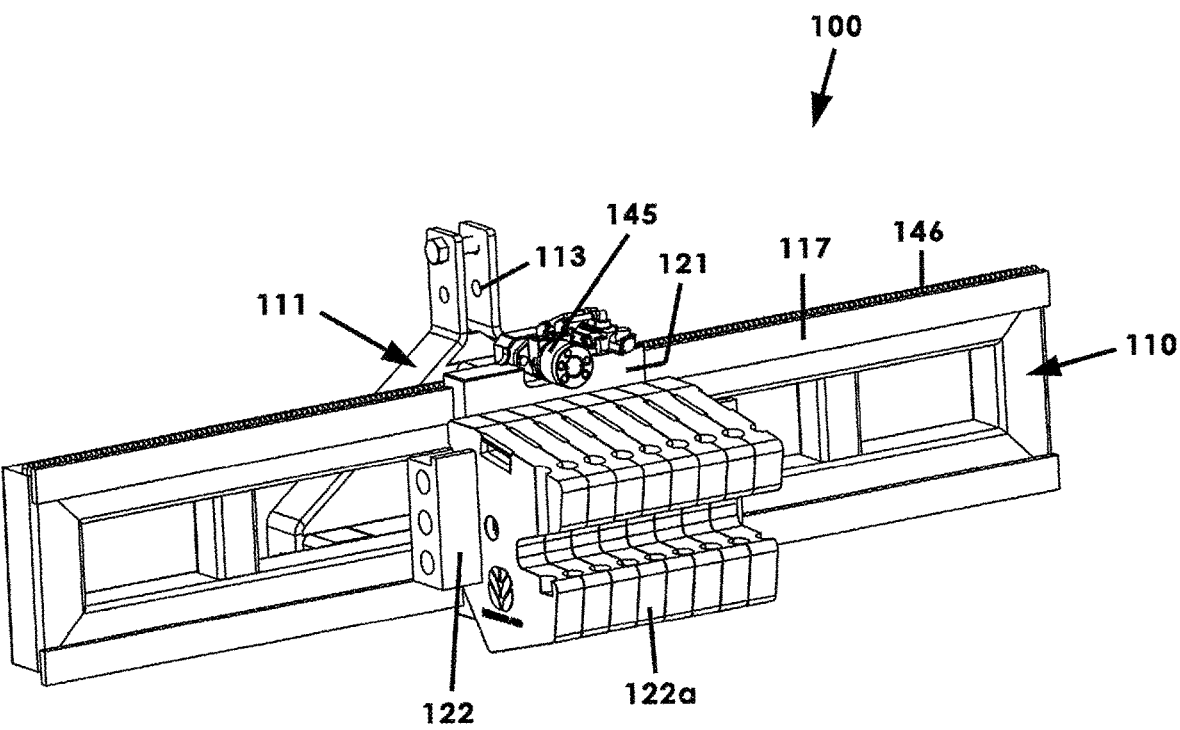
FIG. 5 is a rear perspective view of the automatic balancing system removed from attachment to the tractor.

Referring now to FIG. 5, the counterweight assembly 120 will be described in greater detail. As disclosed earlier, the counterweight assembly 120 includes a weight compartment 122 capable of receiving and containing a plurality of weight plates 122a (or other types of ballast). The weight assembly 120 is essentially a carriage having an upper interface 121 configured for attachment to a carriage track 117 that extends longitudinally atop the mounting assembly 110 so as to slide laterally along said carriage track 113 when energized by the drive mechanism 140. Further, the weight assembly 120 includes a hydraulic motor 135 which is operatively connected to a drive gear 141 (FIG. 6b).

Figure 6A:
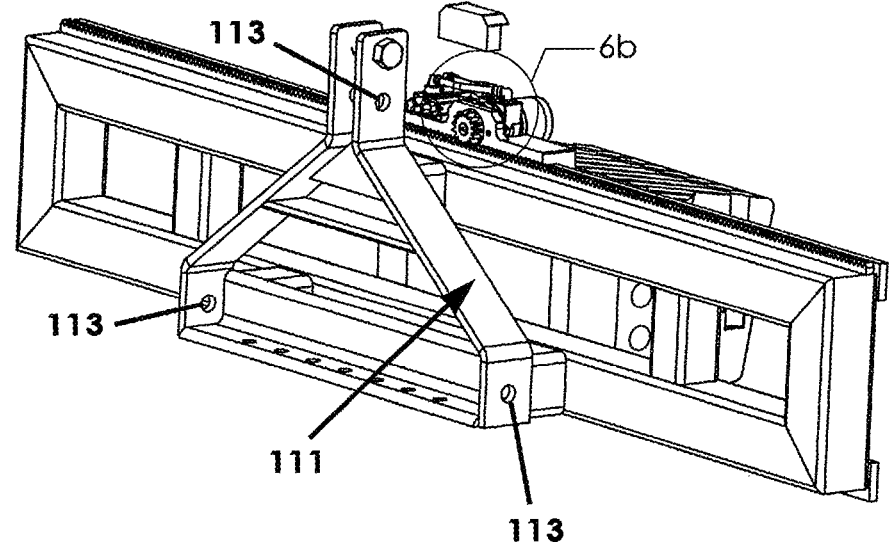
FIG. 6a is a front perspective view of the automatic balancing system of FIG. 5.
Figure 6B:
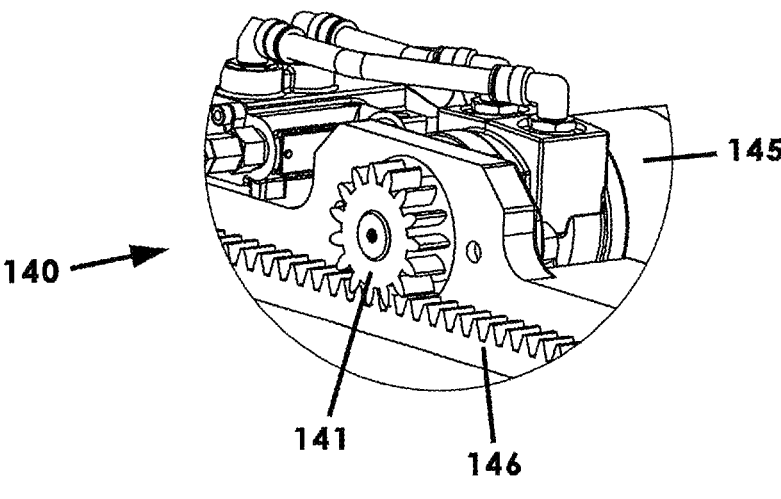

FIG. 6a illustrates that the support assembly 110 may also include a hitch portion 111 having three hitch mounts 113 configured for coupling the mounting frame 110 to the three-point hitch 11 of the tractor 10, such as with pins (not shown).

The drive mechanism 140 includes an elongate gear 146 (such as a pinion gear) that extends the longitudinal extent atop the frame 110 and is in operative communication with the drive gear 141, the drive gear 141 being configured to rotate when the drive motor 135 is energized. As shown, the drive gear 141 and elongate gear 146 may constitute a rack and pinion gear system (FIG. 6b). It will be understood that the entirety of the counterweight assembly 120, including the motor 135, drive gear 141, and weight compartment 122 will all be moved laterally when the motor 135 is energized whereas, by contrast, the mounting assembly 110 including the elongate gear 146 are fixed in place.

Figure 7B:
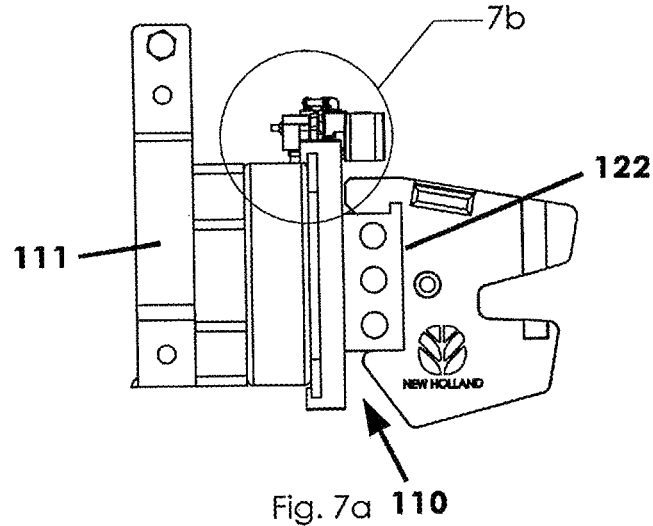
Figure 7B:
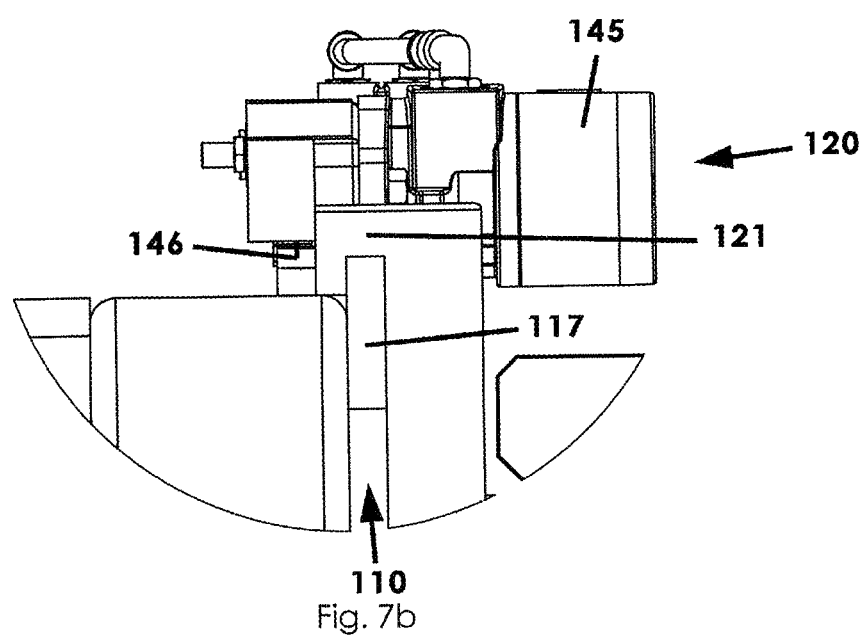

FIGS. 7a and 7b further illustrates the slidable connection between the counterweight assembly 120 and mounting assembly 110. More particularly, the carriage body interface 121 may have an inverted u-shaped configuration received or hooked over or atop the carriage track 117 so that the carriage is configured to move slidably there-along when the motor 145 is energized.

Figure 1:
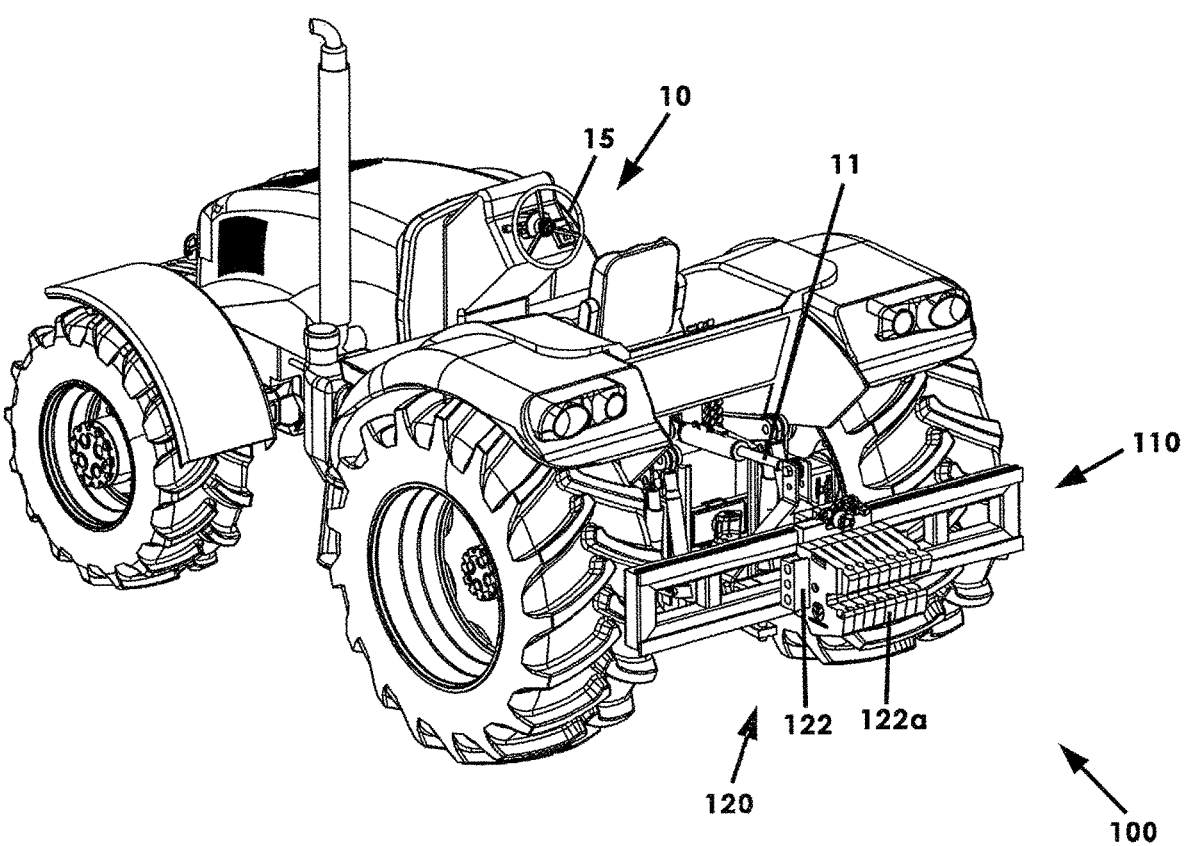
FIG. 1 is a perspective view of an automatic balancing system according to the present invention.
Figure 2:
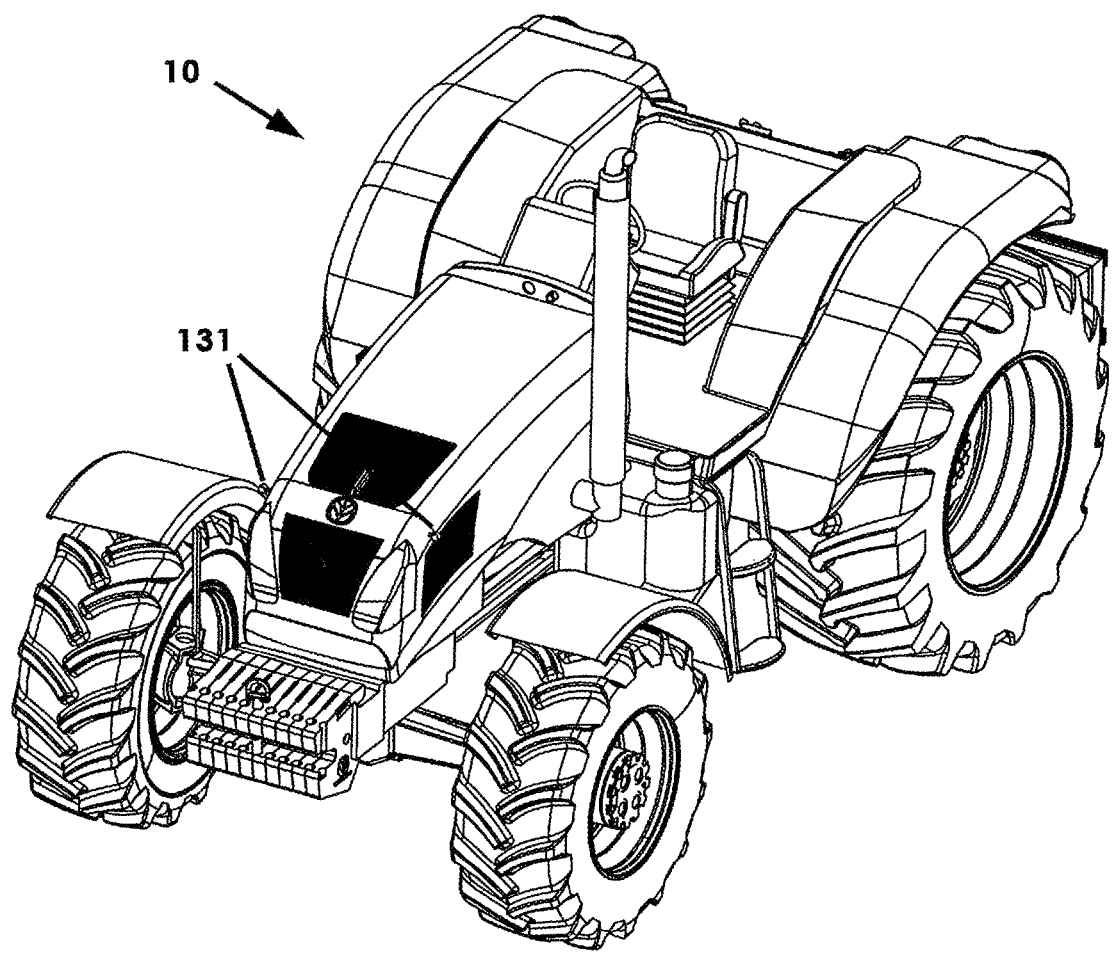
FIG. 2 is a front perspective view of the automatic balancing system as in FIG. 1.
Figure 8A:
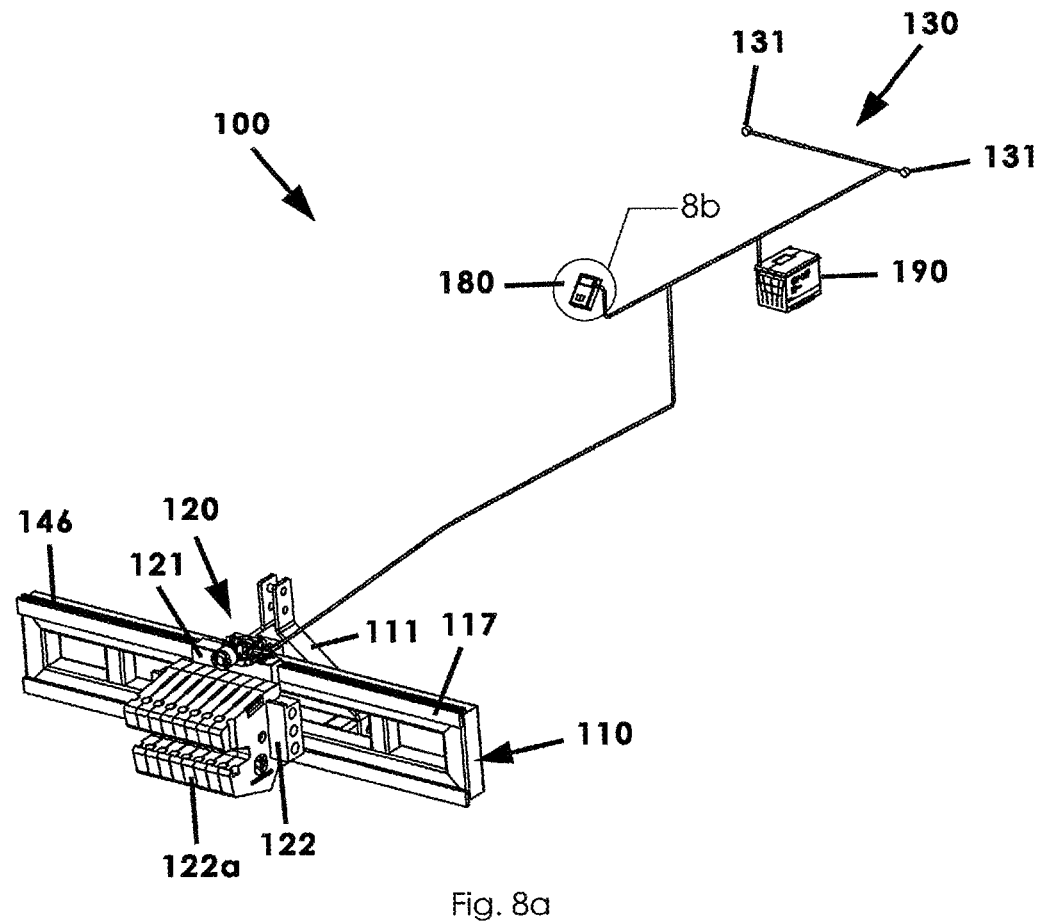
FIG. 8a is a schematic view of the present invention with the tractor removed for the sake of clarity.
Figure 8B:
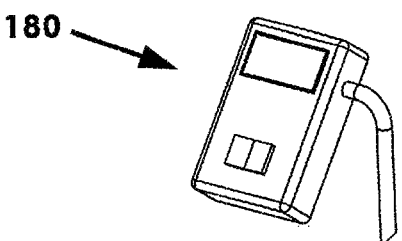
FIG. 8b is an isolated view on an enlarged basis of an input assembly of the automatic balancing system according to the present invention.
Figure 9:
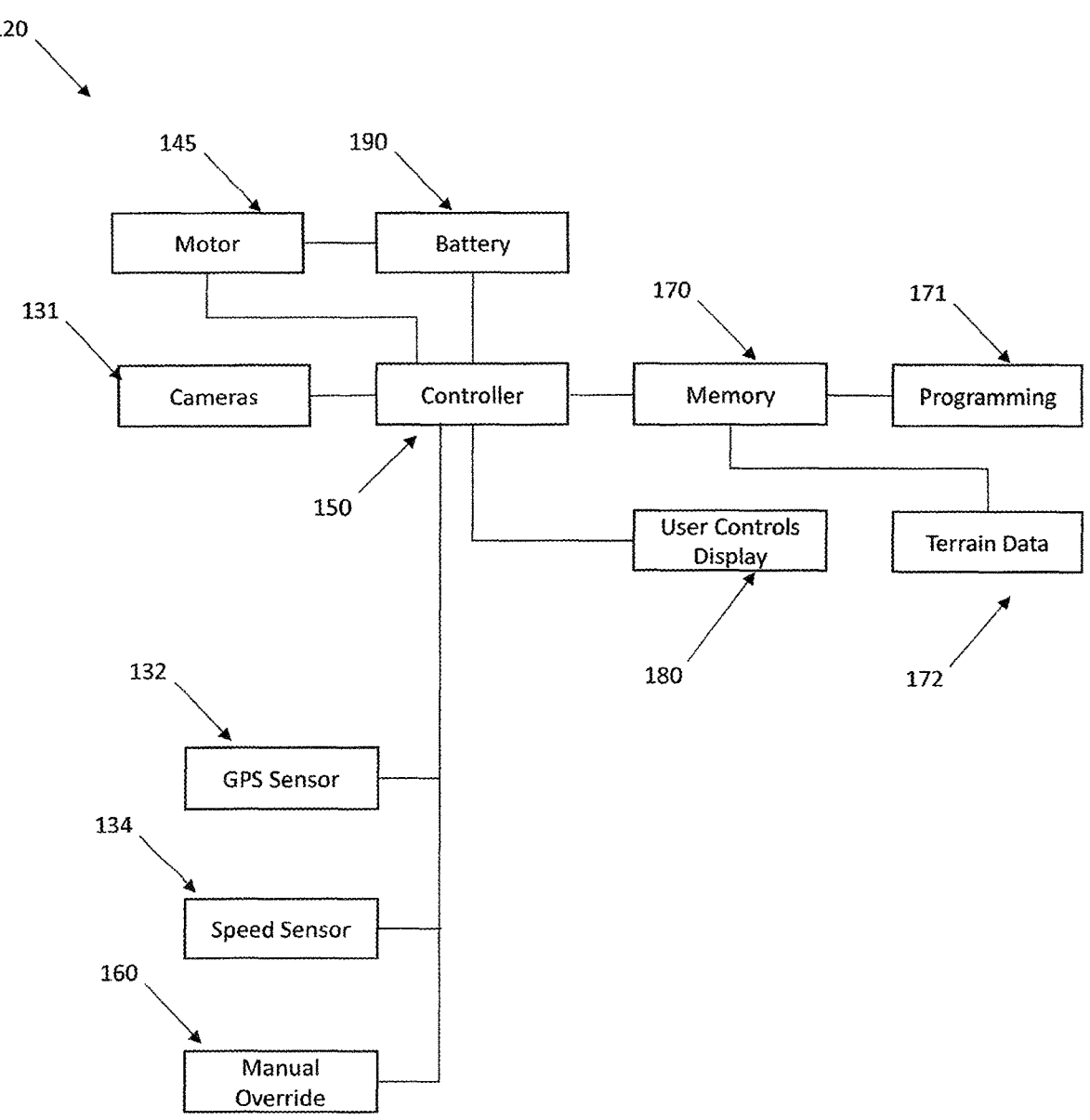
FIG. 9 is a block diagram illustrating the electrical and electronic components according to a preferred embodiment of the present invention.

As shown in FIG. 8, respective input controls 180 may be operatively connected to the cameras 131, to a power source such as a battery 190, and to the motor 145. It is understood that these connections may be by wireless signal, by electrical wires, or other signaling system. In an embodiment, the input controls 180, which may include input buttons and a touch screen display, may be electrically connected to the processor or controller 150 and configured to enable a user to manually control a tilting operation in a manner similar to that described above. The electronics and manual operator controls may be enclosed in an electronics box 15 (FIG. 1). The electronic components of the counterweight assembly 120 are illustrated in FIG. 9.

In an embodiment, an optional manual override control 160 is also provided. This control may be integrated with an existing loader lever or placed elsewhere in the operator's control zone. It allows the operator to override or supplement automatic balancing in real-time, which can be beneficial in complex or unstable conditions. In an embodiment, the override control 160 may include other user controls, a display, buttons, or even a joystick input controller.

In an advanced embodiment, the system also supports predictive balancing. In this configuration, the sensor system 130 includes a GPS receiver 132, speed sensor 134, and directional heading detector 136. These sensors provide the controller 150 with real-time operational data, which is cross-referenced with stored terrain-response data 172 housed in a memory module 170. The memory 170 may be in data communication with the sensor system 130 and configured to store terrain-response data 172. Preferably, the memory module 170 includes a non-volatile memory element that is capable of storing programming 171 as well as camera data and other data generated by respective sensors.

The controller 150, which is in data communication with the memory 170 and operably coupled to the sensor system 130, uses this combined data to predict future tilt events. Based on this prediction, the controller initiates movement of the counterweight in advance of the terrain change, allowing the system to preemptively adjust the lateral weight distribution and improve stability even before the tractor begins to tilt.

This predictive mode allows the tractor to better manage transitions on inclines, declines, side-hill paths, and other terrain irregularities that would otherwise induce instability. More particularly, the automatic leveling system 100 may be configured and programmed in the manner of a robot having an artificial intelligence that repeatedly learns a terrain such that movements of the counterweight assembly 120 are not only a result of real-time operation of the sensor array 130 via predictive through by real-time calculations of stored terrain data (being incrementally stored in memory), GPS, and tractor speed data.

It is understood that while certain forms of this invention have been illustrated and described, it is not limited thereto except insofar as such limitations are included in the following claims and allowable functional equivalents thereof.

What is claimed is:

1. An automatic leveling system for a tractor, the system comprising:

a counterweight assembly configured to translate laterally relative to a longitudinal axis of the tractor;

a weight compartment contained within the counterweight assembly and configured to receive one or more ballast weights selected based on a size of the tractor, a weight of an operator, and a grade on which the tractor operates;

a sensor array configured to detect a tilt angle or grade of the tractor;

a drive mechanism coupled to the counterweight assembly and configured to move the counterweight assembly laterally in response to data from the sensor array, so as to automatically adjust a lateral distribution of weight to counteract tilting of the tractor; and a manual override control configured to allow an operator to override the automatic control of the counterweight assembly.

2. The system of claim 1, further comprising a mounting structure configured to attach the automatic leveling system to a standard three-point hitch of the tractor.

3. The system of claim 1, further comprising a controller operatively connected to the sensor array and the drive mechanism, the controller being configured to: (a) receive sensor input indicating a tilt condition, (b) determine a weight shift direction and magnitude, and (c) actuate the drive mechanism to reposition the counterweight assembly accordingly.

4. The system of claim 3, wherein the controller includes a user interface enabling input of tractor-specific or terrain-specific parameters.

5. The system of claim 1, wherein the drive mechanism comprises one or more hydraulic cylinders operable to shift the counterweight assembly laterally.

6. The system of claim 1, wherein the drive mechanism comprises a winch and pulley assembly configured to translate the counterweight assembly.

7. The system of claim 1, wherein the drive mechanism comprises a gear-based cog-to-cog translation system.

8. The system of claim 1, wherein the sensor array comprises at least one accelerometer and one gyroscope.

9. The system of claim 8, wherein the sensor array is part of an inertial measurement unit (IMU).

10. The system of claim 1, wherein the manual override control is integrated with a loader lever of the tractor.

11. The system of claim 1, wherein the counterweight assembly is configured to move laterally a distance equal to at least half the width of the tractor.

12. The system of claim 1, wherein the automatic leveling system is configured to stabilize the tractor and increase traction during operation in four-wheel drive mode.

13. The system of claim 1, wherein the counterweight assembly includes a liquid or granular fillable chamber in addition to solid ballast weights.

14. The system of claim 1, wherein the sensor array is configured to detect both lateral and longitudinal tilt, and the controller is configured to calculate a composite tilt vector to determine counterweight adjustment direction.

15. The system of claim 1, wherein the controller is further configured to store and retrieve balancing data based on previously encountered terrain.

16. The system of claim 1, wherein the automatic leveling system is further configured to mount to a riding lawn mower, an all-terrain vehicle (ATV), a sport utility vehicle (SUV), or heavy machinery.

17. An automatic predictive leveling system for a tractor, the system comprising:

a counterweight assembly configured to translate laterally relative to a longitudinal axis of the tractor;

a weight compartment contained within the counterweight assembly and configured to receive one or more ballast weights selected based on a size of the tractor, a weight of an operator, and anticipated terrain conditions;

a sensor system configured to detect (1) terrain or tilt response data and (2) operating parameters of the tractor including speed and directional heading;

a non-volatile memory in data communication with said sensor system and for storing said terrain or tilt-response data; and

a controller in data communication with the memory and operably coupled to the sensor system and to a drive mechanism, the drive mechanism being operably configured coupled to the counterweight assembly, wherein the controller is configured to:

(a) evaluate the operating parameters of the tractor;

(b) predict an upcoming tilt condition or change in grade based on the operating parameters and data stored in the memory; and (c) initiate movement of the counterweight assembly laterally in advance of the tractor experiencing the tilt or grade condition, thereby automatically adjusting a lateral distribution of weight to preemptively counteract an anticipated tilt.

18. The system of claim 17, wherein the memory includes a digital terrain map used to anticipate terrain-related tilt conditions.

19. The system of claim 17, wherein the controller is further configured to correlate vehicle speed with upcoming terrain features to optimize timing of counterweight movement.

20. The system of claim 17, wherein the sensor system comprises a GPS receiver and inertial measurement unit (IMU).

21. The system of claim 17, wherein the drive mechanism comprises a hydraulic actuator.

22. The system of claim 17, further comprising a manual override switch configured to interrupt or delay predictive movement of the counterweight assembly.

23. The system of claim 17, wherein the predictive leveling system is adapted to operate in a rear-mounted configuration connected to the tractor's hitch.

24. The system of claim 17, wherein the controller is configured to update the memory with learned tilt-response profiles based on actual operating history of the tractor.

* * * * *